United States Patent [19]
Handler

[11] Patent Number: 5,323,988
[45] Date of Patent: Jun. 28, 1994

[54] SEISMIC BRACE FOR ELECTRIC CABLE TRAY

[76] Inventor: Isidore Handler, 2960 Kinloch Rd., Wantagh, N.Y. 11793

[21] Appl. No.: 66,339

[22] Filed: May 21, 1993

Related U.S. Application Data

[63] Continuation of Ser. No. 793,811, Nov. 18, 1991, abandoned.

[51] Int. Cl.⁵ ............................................. F16L 3/00
[52] U.S. Cl. ............................ 248/49; 248/58; 248/68.1; 248/317
[58] Field of Search ............... 248/49, 58, 59, 317, 248/327, 72, 228, 68.1

[56] References Cited

U.S. PATENT DOCUMENTS

| | | | |
|---|---|---|---|
| 602,517 | 4/1898 | McFadden | 248/317 X |
| 2,750,143 | 6/1956 | Sjoboen | 248/317 |
| 3,363,048 | 1/1968 | Vaughn | 248/68.1 X |
| 3,436,047 | 4/1969 | Foltz | 248/317 |
| 3,570,794 | 3/1971 | Kirschner | 248/327 X |
| 4,078,752 | 3/1978 | Kindorf | 248/68.1 X |
| 5,004,193 | 4/1991 | Kirschner | 248/59 |
| 5,123,618 | 6/1992 | Guterman et al. | 248/68.1 X |

FOREIGN PATENT DOCUMENTS

750069  5/1944  Fed. Rep. of Germany ...... 248/317

*Primary Examiner*—David A. Scherbel
*Assistant Examiner*—Derek J. Berger
*Attorney, Agent, or Firm*—Ostrolenk, Faber, Gerb & Soffen

[57] ABSTRACT

A seismic brace or restraint for supporting the spine of lengths of electric cable tray. The seismic brace has a generally U-shaped yoke. The ends of the spines of two adjacent sections of cable tray are supported between the arms of the yoke. A cap over the yoke is supported by a hanger rod. The hanger rod inhibits the cap from moving vertically. The cap and yoke have formations enabling the yoke to be slid longitudinally of the cable tray into position at the cap with the cable tray spines in the yoke. Lateral struts extend in opposite directions laterally from the cap to inhibit lateral motion of the brace. Longitudinal struts extend in opposite longitudinal directions from the cap to inhibit longitudinal motion of the brace. The struts are supported on side brackets positioned on the cap.

7 Claims, 3 Drawing Sheets

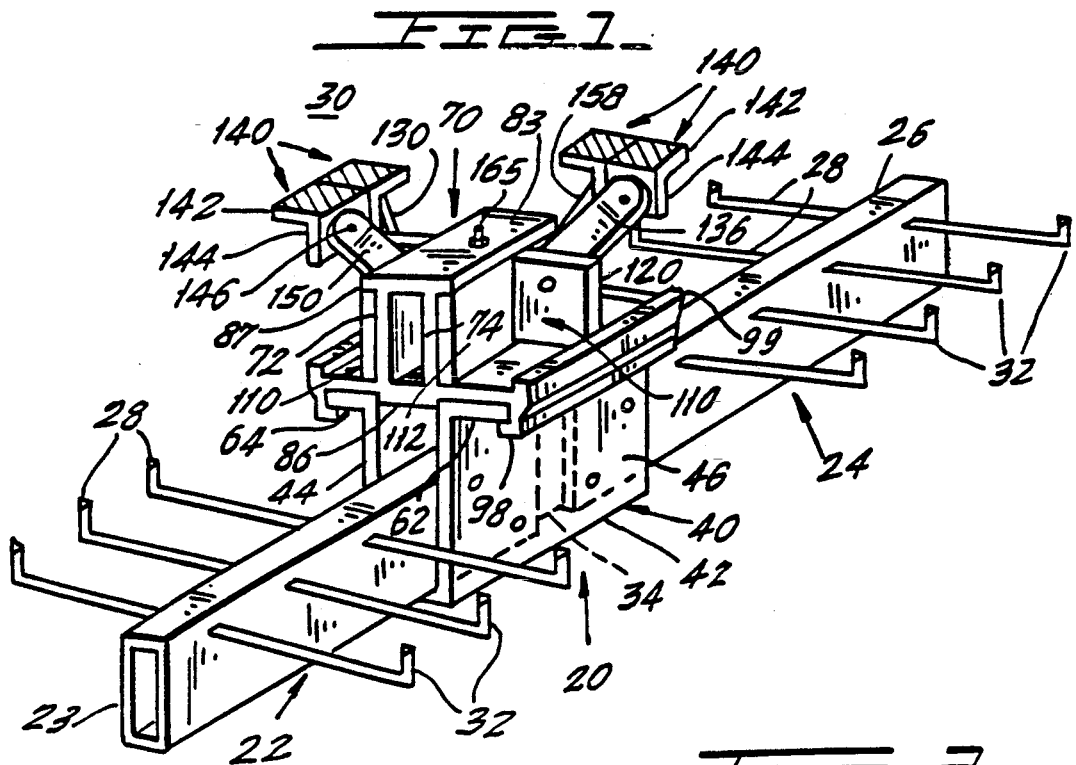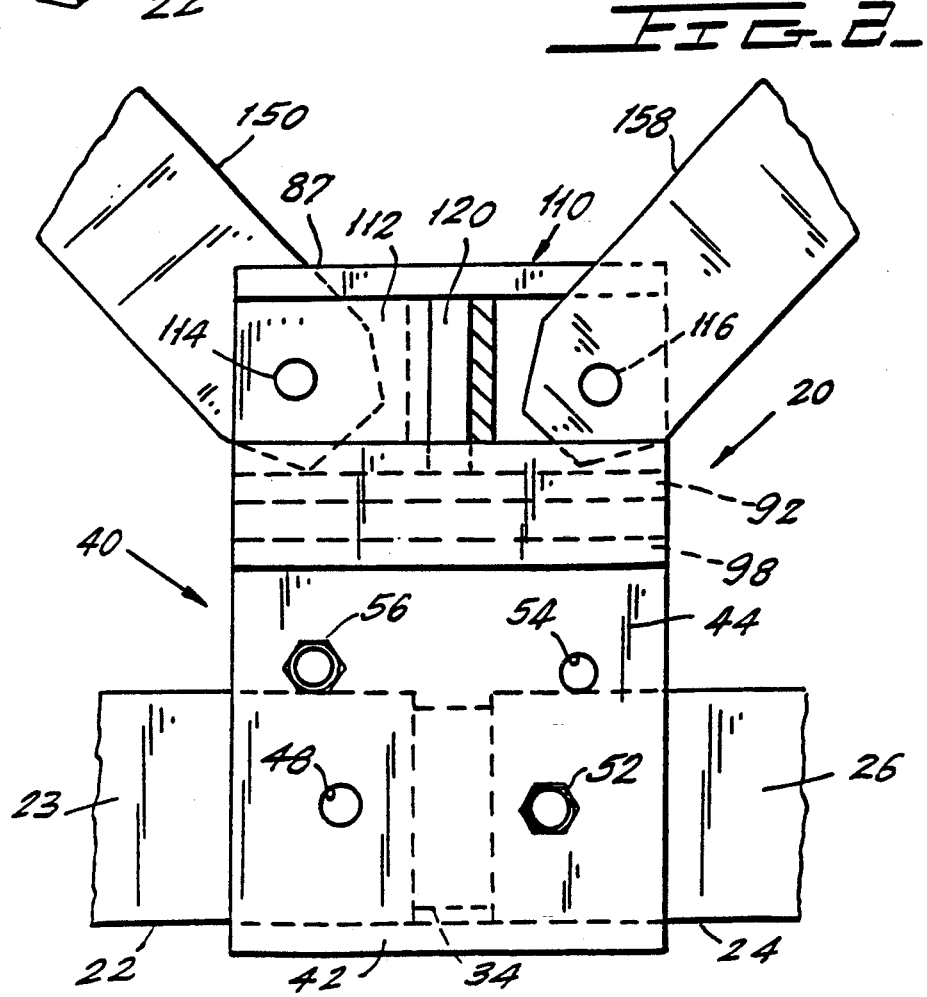

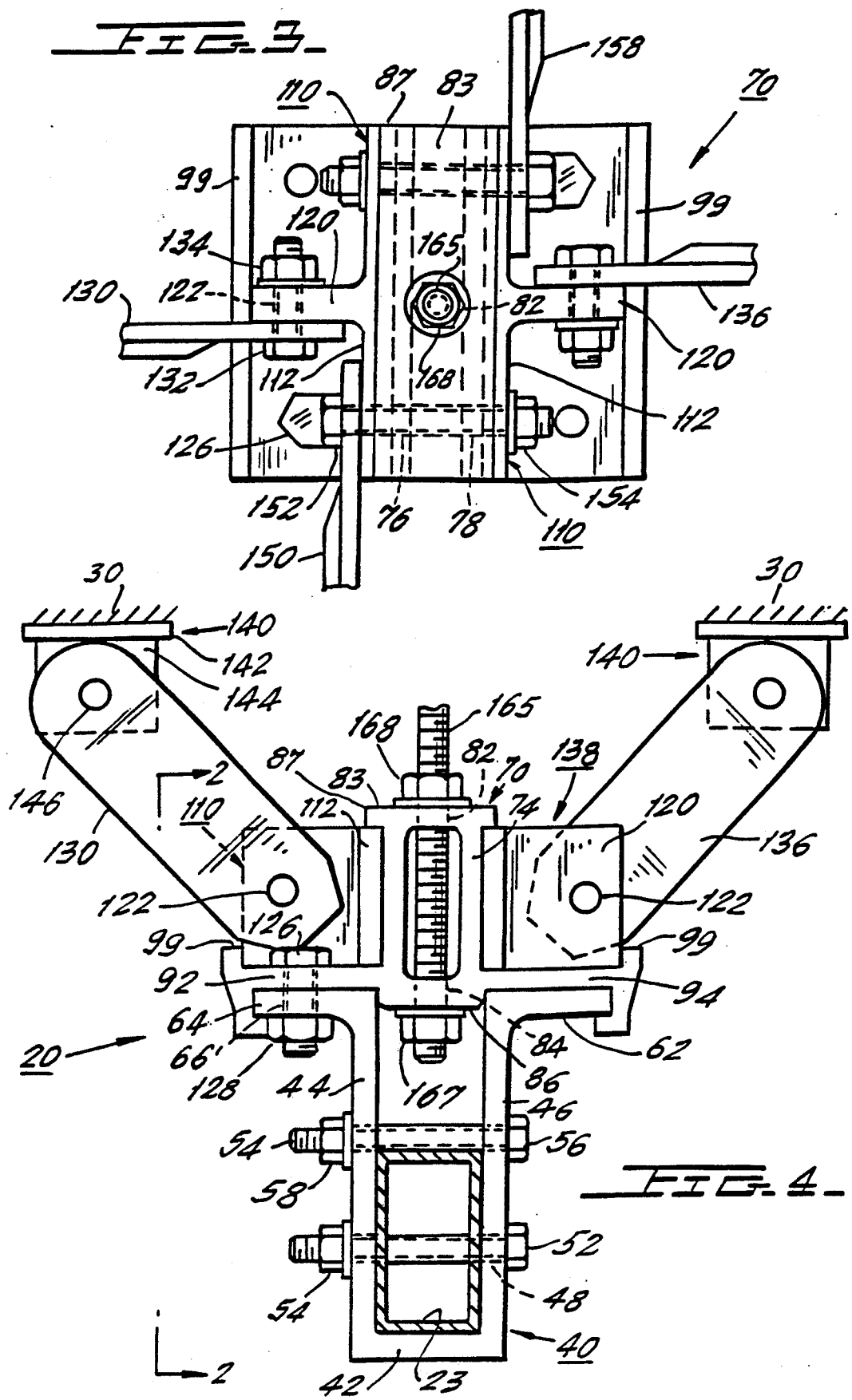

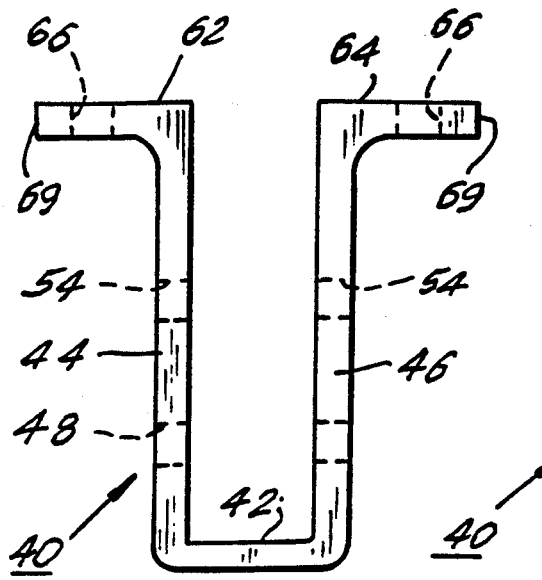
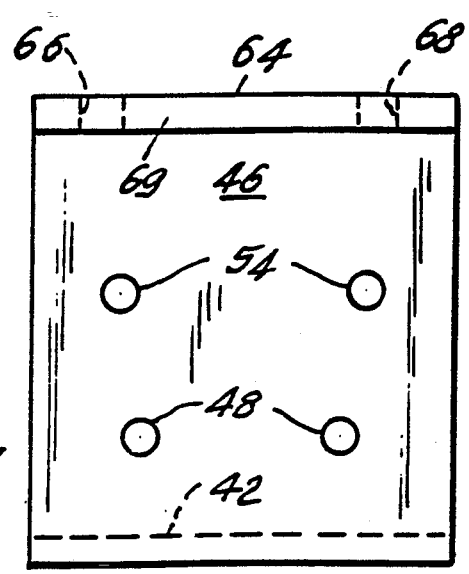
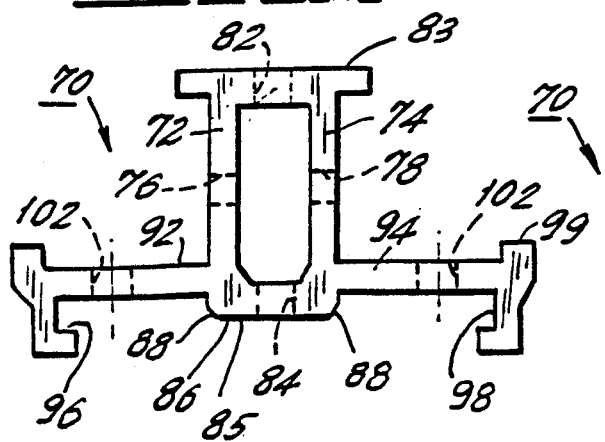
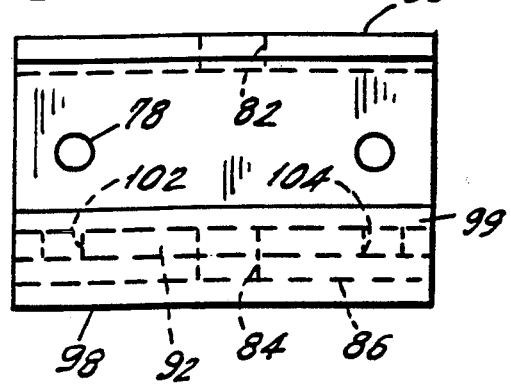
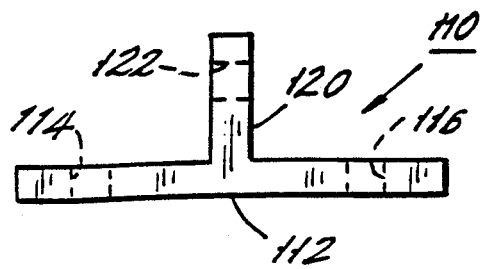
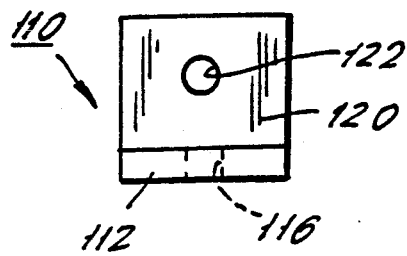

SEISMIC BRACE FOR ELECTRIC CABLE TRAY

This is a continuation of application Ser. No. 07/793,811, filed on Nov. 18, 1991, now abandoned.

BACKGROUND OF THE INVENTION

The present invention relates to a cable tray for electric cable used in buildings, factories and other structures and particularly to a seismic brace or restraint for the cable tray.

Electric wire or cables extend through homes, factories, buildings and other structures. The cables could be stretched the substantial distance between widely spaced supports. But they would hang down, stretch or be damaged. The cables are instead supported on elongate trays that are suspended from ceilings, beams, walls, etc. along their path to where the cables are connected.

Cable trays can take various forms. One type, for which the invention is particularly adapted, is suspended from an overhead structure, such as a ceiling, the underside of the floor above, structural beams, etc. This cable tray may have an elongate center support or spine with elongate trays extending along opposite sides of the center support spine, or possibly may have an "L" arrangement with a vertical support and a cable supporting tray off to only one lateral side of the support. The cable tray is supported from the structure above by hangers located at spaced apart intervals along the tray.

Some geographic localities are subject to earthquakes and earth tremors. Building code writers and builders have desired a seismic restraint or brace for supporting a cable tray, which restraint or brace can be subjected to the movement of a structure during an earth tremor without the brace breaking or releasing its hold on the cable tray or separating from the supporting structure above.

A cable tray is assembled from a plurality of elongate sections. Each of the sections may have a central spine. The ends of adjacent sections meet at a splice connector. Normally, a simple cable tray hanger rod is attached between the splice connector and the supporting structure above the hanger rod. In the event of an earth tremor or earthquake, the hanger rod may separate from the support above it, or may break the rod, or connector or spine, or the splice connector may separate from the hanger rod or from the spine of one of the sections of the cable tray.

SUMMARY OF THE INVENTION

It is the primary object of the present invention to provide a seismic restraint or brace for connected sections of cable tray which will support the tray sections to avoid that shifting that might destroy or separate elements of the cable tray which could occur during an earth tremor or earthquake.

A further object of the invention is to provide such a seismic brace which inhibits the cable tray from shifting laterally or longitudinally or up and down with respect to the structure to which it is attached.

Another object of the invention is to provide such a seismic restraint or brace which is easy to assemble on site.

Another object of the invention is to minimize the expense of the cable tray installation and particularly its seismic restraint or brace.

The seismic brace or restraint according to the invention comprises a number of components. There is a supporting yoke through which the ends of the spines and/or the splice connector between adjacent spine ends of the cable tray pass. A cap is attached above the yoke to provide connections to struts. A hanger rod is suspended from the structure above and is connected with the cap to support the yoke. Struts are connected to the cap, some by means of side brackets supported on the cap. The struts are connected to the underside of a structure beneath which the cable tray is supported, e.g. a ceiling. At least one strut and preferably a plurality of struts extend in directions that inhibit the seismic brace from moving laterally, e.g. one strut is inclined off in each lateral direction away from the brace. At least one strut and preferably a plurality of struts extend in directions that inhibit the seismic brace from moving longitudinally, e.g. one strut is inclined off in each longitudinal direction away from the brace. The hanger rod above the seismic brace inhibits the brace from shifting vertically. Therefore, the seismic brace is restrained from moving along all three axes.

Other objects and features of the present invention will become apparent from the following description of a preferred embodiment of the invention considered in conjunction with the accompanying drawings.

BRIEF DESCRIPTION OF THE DRAWINGS

FIG. 1 is a perspective view of the seismic brace or restraint for cable tray with sections of supported cable tray;

FIG. 2 is a side view of the brace in the direction of arrows 2 in FIG. 4;

FIG. 3 is a top view thereof;

FIG. 4 is an end view thereof;

FIG. 5 is an end view of the yoke for the seismic brace;

FIG. 6 is a side view thereof;

FIG. 7 is an end view of the cap for the seismic brace;

FIG. 8 is an end view thereof;

FIG. 9 is a side view of a side bracket for struts of the seismic brace; and

FIG. 10 is an end view thereof.

DESCRIPTION OF THE PREFERRED EMBODIMENT

The seismic brace 20 of the present invention is adapted for supporting lengths of cable tray sections 22 and 24. Those lengths of cable tray may be of any conventional type which is adapted for being suspended beneath a ceiling, the underside of a floor, a beam or any other structure 30 above the cable tray. The cable tray sections 22, 24 include respective spines 23, 26. One embodiment of cable cable tray shown in FIG. 1 includes upwardly bent arms 28 and 32 which project from opposite sides of the spines 23, 26 and the cables (not shown). The particular cable tray design with which the present invention may be used is not part of the invention. But, each tray section 22, 24 has a spine, which is adapted to be connected to the spine of an adjacent tray section and which is adapted to be supported by seismic brace 20 of the invention.

In the illustrated tray embodiment, the spines 23, 26 are generally of rectangular cross-section, as seen in FIGS. 1 and 4, but other shaped spines may be used. The below described yoke 40 of the seismic brace would have its spine support 42, 44, 46 adapted to the cross-sectional shape of the spine 23 or 26 supported in the yoke.

The individual sections of cable tray 22 and 24, particularly at their spines, are longitudinally aligned and adjacent sections 22 and 24 are joined at an appropriate splice connector 34. With a hollow rectangular spine shown in FIG. 1, the splice connector 34 can be a block of short length, rectangular in cross-section, which is installed into the opposing adjacent open ends of the spines 23 and 26 to align and hold the spines together.

As shown in FIGS. 5 and 6 and in the assembly views of FIGS. 1–4, the yoke 40 is a generally U-shaped body having a bottom yoke wall 42 on which the end portions of two adjacent spines 23, 26 sit and having side arms 44, 46 of the U which are spaced apart and shaped to securely hold the sides of the spines 23, 26 there between. The side arms 44, 46 have lower bolt holes 48 extending there through. Bolts 52 are passed through the holes 48 at one side arm and are secured by nuts 50 at the other side arm. The same bolts are also passed through aligned openings across the end regions of the spines and across the splice connector between the spines, as seen in FIG. 4. When the bolt and nut combinations 52, 58 are tightened together, they squeeze the arms 44, 46 against the sides of the spines 23, 26 and hold the spines and the splice connector 34 securely together.

Optionally, there may be upper holes 54 through the arms 44 and 46 of the yoke to receive additional securing bolts 56 which are held in place by the nuts 58. These additionally hold the U arms 44, 46 tightly against the spines but are also placed along the arms to provide top side securement for the spines 24 for preventing vertical bounce of the spines in the yoke. The additional bolts 56 are optional, as the bolts 52 and nuts 50 may sufficiently hold the spines.

The top ends of the yoke arms 44, 46 meet in respective outwardly directed yoke flanges 62, 64. The flanges each have a respective pair of holes 66 and 68 disposed toward the opposite longitudinal ends of the yoke. Each hole 66, 68 receives fastening means for fastening a respective side bracket 110 for a strut to the yoke 40, as described below. The flanges 62, 64 terminate at outboard ends 69 which cooperate with a cap 70 described below.

A cap 70 shown in FIGS. 7 and 8 and in the assembly FIG. 1–4 is disposed above and on the yoke 40. The cap includes a central section including opposite side walls 72, 74 each provided with a respective opening 76, 78 through it for attachment to a respective longitudinal motion restraining strut 150 described below. The open space between the walls 72, 74 permits passage therethrough of a hanger rod 165, described below. There is a passage opening 82 through the top wall 83 and a passage opening 84 through the bottom wall 85 at the central section for the hanger rod 165 to pass through and be attached to the cap 70.

Short length lateral flanges 87 extend out from both lateral sides of the central portion of the cap 70 at its top form a channel for the floor 112 of the side bracket 110 in cooperation with the respective lateral side arm 92 or 94 of the cap.

The cap 70 has a longitudinally extending, depending bottom portion 86 with edge chamfers 88 which define the width of the bottom portion 86 to match the space between the arms 44, 46 of the ,yoke so that the cap can be seated at the top of the yoke 40 in the space between the arms 44, 46, which positions the cap laterally.

Opposite lateral side arms 92, 94 terminate in depending end hooks 96, 98. The height and placement of the hooks 96, 98 is coordinated with the locations of the flange ends 69 of the yoke flanges 62, 64 so that the cap can be secured on the yoke. In particular, the projecting bottom 86 and the edge chamfers 88 on the cap and the hooks 96, 98 are so placed that the yoke 40 can be slid longitudinally into its position under the cap 70, enabling easy installation and proper placement of the parts together. There are upstanding abutments 99 on the arms 92 and 94 which position the side brackets 110, as described below.

Each arm 92 and 94 of the cap is also provided with two holes 102, 104 toward the opposite longitudinal ends of the arm. The holes 102, 104 are aligned with the respective holes 66, 68 in the respective flange 62 or 64 of the yoke to receive a bolt 126 that secures the cap 70 to the yoke 40. As shown in FIG. 4, a bolt 126 passes through each set of aligned holes 102, 66 and 104, 68 for connecting the cap to the yoke, and the nut 128 completes that connection when secured on the bolt 126.

A respective side bracket 110 for a lateral motion inhibiting strut is shown in FIGS. 9 and 10 and in the assembly Figures. The side bracket 110 has a floor 112 in which there are two openings 114, 116 toward the opposite longitudinal ends. As the floor 112 is oriented vertically in the channel between the flange 87 and the arm 92, the openings 114, 116 overlie the openings 76 or 78 on one side wall 72 or 74 of the cap 70 and the side bracket is fastened there by the same bolts 152, 154 that hold the longitudinal struts 150 or 158, as described below. The side bracket 110 has an upstanding strut support plate 120 with a bolt receiving opening 122 through which a bolt 132 for supporting a lateral motion inhibiting strut 130 or 136 is disposed.

On the respective side bracket 110 shown in FIGS. 3 and 4, a respective inclined lateral motion inhibiting strut 130 is attached at the bracket hole 122 by a bolt 132 secured by a nut 134. Although the single lateral strut 130 inhibits lateral motion in either direction, a second lateral strut 136 may be connected in the same manner to a second identical side bracket 138 at the other side of the central section of the cap 70. The top end of the lateral strut 132 is attached to an angle piece 140 which has one arm 142 attached beneath the ceiling 30 and another arm 144 which is bolted at 146 to the top end of the strut. The top end of the strut 136 is similarly bolted to an angle piece 140 at the ceiling 30. The connection of the two lateral motion inhibiting struts 130, 136 to the cap inhibits the seismic brace from shifting laterally with reference to the direction of extension of the cable tray.

In FIG. 3, a first inclined longitudinal strut 150 is attached to the cap 70 and also at the floor 112 of the bracket 110 at the cap openings 76, 78 by the bolt 152 which is secured by the nut 154 in those openings. The longitudinal strut 150 extends up from the cap 70 at an incline and toward the ceiling 30 where it is fastened to the ceiling by another angle piece 140. At the holes 76, 78 at the other longitudinal end of the cap 70 there is a second longitudinal motion inhibiting strut 158 which is held in place at the holes 76, 78 by a respective bolt and nut combination. The strut 158 also extends up to the ceiling at an incline that is in the opposite direction from the incline of the longitudinal motion inhibiting strut 150, similar to what is shown for the lateral motion inhibiting struts 130 and 136. The struts 150 and 158 cooperate to prevent longitudinal shifting of the seismic brace in either direction.

To prevent undesired vertical motion of the longitudinal brace, a conventional hanger rod 165 is conventionally secured directly into the ceiling 30 above or into a sleeve at the ceiling. The hanger rod 165 extends down through the openings 82, 84 in the central portion of the cap 70. The rod 165 is secured firmly to the cap between a nut 167 on the rod 165 below the cap and a nut 168 secured on the hanger rod above the cap 70 to capture the cap between the nuts 167 and 168. This prevents the vertical shifting of the cap with respect to the hanger rod.

Undesired motion of the seismic brace under the effects of an earth tremor or earthquake along any of the three axes is inhibited by the seismic brace.

The structure described may be easily assembled at the site of its use. The hanger rod 165 is installed at the ceiling 30. The upper nut 168 is installed on the hanger rod. The cap 70 is installed on the hanger rod under the nut 168. The nut 167 is installed under the cap to fasten the cap on the hanger rod. A splice connector 34 is placed in adjacent opposed open ends of cable tray section spines 22, 24 and these are placed in the yoke. Then the yoke 40 is secured at 52, 56 to the spines and the splice connector. The yoke with the spines and the splice connector in place is then slid into the hooks 96, 98 of the cap and past the projection 86 of the cap, which positions the yoke with the cable tray spines and the cable tray sections on the cap. The cap and the yoke are secured together by the bolts 126, 128. Then the side brackets 110, 138 are positioned to be later secured to the cap 70. The longitudinal motion inhibiting struts 150 and 158 are attached at their respective attachment holes 76, 78 by the bolts and nuts 152, 154 which also secure the side brackets 110, 112 to the cap 70, 72, 74. Then the lateral motion inhibiting struts 130 and 136 are bolted by bolts 132 to the support plate 120.

The foregoing assembly process is easy and it is hoped that it can be performed by one person. It does not require the assembler to hold a large number of elements in place while they are assembled. Instead, the elements are easy to assemble in sequence. The resultant seismic brace and restraint should be effective to resist shifting, bending and breaking during an earth tremor or earthquake.

The strength of the seismic brace or restraint is in part dependent upon the materials used for making it and in the thickness of its elements. For example, the seismic restraint or brace may be comprised of aluminum or other metal or of a plastic material. All of the major components are shown as shaped in a manner which permits them to be extruded and then cut and punched to the desired dimensions and shape. For example, extruded aluminum or plastic may be used.

Although the present invention has been described in relation to a particular embodiment thereof, many other variations and modifications and other uses will become apparent to those skilled in the art. It is preferred, therefore, that the present invention be limited not by the specific disclosure herein, but only by the appended claims.

What is claimed is:

1. A construction comprising an elongated cable tray and a seismic brace supporting said elongated cable tray with its longitudinal axis in an operative position below an overhead supporting structure, said brace including:

a yoke operatively engaging and supporting said elongated cable tray;
a cap supporting said yoke from above;
said cap and said yoke each having a respective overall dimension measured in a direction parallel to said longitudinal axis of said cable tray;
said cable tray being many times longer than both of said overall dimensions;
vertically extending hanger means operatively engaged with said cap and supporting same in an operative position below an overhead supporting structure;
first means operatively extending upward from said cap and adapted for connection to an overhead supporting structure for inhibiting motion of said brace longitudinally with respect to said longitudinal axis of said cable tray supported thereby;
second means operatively extending upward from said cap and adapted for connection to an overhead supporting structure for inhibiting motion of said brace transversely with respect to said longitudinal axis of a cable tray supported thereby;
cooperating formations on said yoke and said cap for permitting longitudinal sliding movement relative to each other while the cap supports the yoke.

2. A construction as defined by claim 1 in which the cooperating formations include oppositely facing hook means on the cap.

3. A construction as defined by claim 2 in which the cooperating formations also include horizontal flange sections that extend outwardly into said hook means.

4. A seismic brace for supporting an elongated cable tray with its longitudinal axis in an operative position below an overhead supporting structure, said brace including:

a yoke for operatively engaging and supporting an elongated cable tray;
a cap supporting said yoke from above;
vertically extending hanger means operatively engaged with said cap and supporting same in an operative position below an overhead supporting structure;
first means operatively extending upward from said cap and adapted for connection to an overhead supporting structure for inhibiting motion of said brace longitudinally with respect to a longitudinal axis of a cable tray supported thereby;
second means operatively extending upward from said cap and adapted for connection to an overhead supporting structure for inhibiting motion of said brace transversely with respect to a longitudinal axis of a cable tray supported thereby;
said yoke being of generally U-shaped cross-section formed by horizontally spaced first and second vertical arms and a web extending between said arms at their lower ends;
said arms being disposed to have a cable tray extend therebetween while being supported from below by said web.

5. A seismic brace as defined by claim 4 in which said cap includes a bottom formation that extends into a space between said arms at their upper ends to position said yoke transversely relative to said cap.

6. A seismic brace as defined by claim 5 also including means for clamping a cable tray extending between said arms against longitudinal movement relative to said brace.

7. A seismic brace as defined by claim 4 in which there are cooperating formations on said yoke and said cap that permit longitudinal sliding movement relative to each other while the cap supports the yoke;

said cooperating formations including oppositely facing hook means on the cap; and said cooperating formations also including horizontal flange sections that extend outwardly into said hook means.

* * * * *